(12) United States Patent
Petit Jean

(10) Patent No.: US 8,757,334 B2
(45) Date of Patent: Jun. 24, 2014

(54) CONTROLLED FRICTION DAMPING DEVICE

(75) Inventor: Benoit Petit Jean, Chaville (FR)

(73) Assignee: European Aeronautic Defence and Space Company EADS France, Paris (FR)

(*) Notice: Subject to any disclaimer, the term of this patent is extended or adjusted under 35 U.S.C. 154(b) by 21 days.

(21) Appl. No.: 13/582,473

(22) PCT Filed: Mar. 3, 2011

(86) PCT No.: PCT/EP2011/053199
§ 371 (c)(1),
(2), (4) Date: Sep. 28, 2012

(87) PCT Pub. No.: WO2011/107548
PCT Pub. Date: Sep. 9, 2011

(65) Prior Publication Data
US 2013/0015029 A1 Jan. 17, 2013

(30) Foreign Application Priority Data
Mar. 3, 2010 (FR) ...................................... 10 51539

(51) Int. Cl.
*F16F 9/32* (2006.01)
(52) U.S. Cl.
USPC ..................................................... 188/266.7
(58) Field of Classification Search
USPC ............... 188/267.1, 267.2, 266.1–266.7; 52/167.1–167.9; 248/550–566
See application file for complete search history.

(56) References Cited

U.S. PATENT DOCUMENTS

| 6,378,671 | B1 | 4/2002 | Carlson | |
| 8,307,585 | B2 * | 11/2012 | Mualla | 52/167.4 |
| 8,550,222 | B2 * | 10/2013 | Browne et al. | 188/267.1 |

FOREIGN PATENT DOCUMENTS

| CN | 200989012 A | * 12/2007 |
| CN | 101250909 A | * 8/2008 |
| EP | 1277984 A1 | 1/2003 |
| WO | 0173313 A2 | 10/2001 |

OTHER PUBLICATIONS

International Search Report dated May 9, 2011, from corresponding EP application.

* cited by examiner

*Primary Examiner* — Christopher Schwartz
(74) *Attorney, Agent, or Firm* — Young & Thompson

(57) ABSTRACT

A semi-active device is used to damp vibrations moving relative to two elements between which the device is fixed. This device includes:
a first member extending axially along a longitudinal axis;
a second member extending axially along the same longitudinal axis, the two members being guided translatably relative to one another;
a friction element extending between the two members and connecting them completely to each other by friction in an axial translational direction for any force below a threshold 's', the force tending to create a relative translational movement of the two members along the longitudinal axis;
an adjustment device enabling the value of the threshold to be adjusted. Thus adjusting the slip threshold of the friction element enables the dissipation conditions to be adjusted.

4 Claims, 2 Drawing Sheets

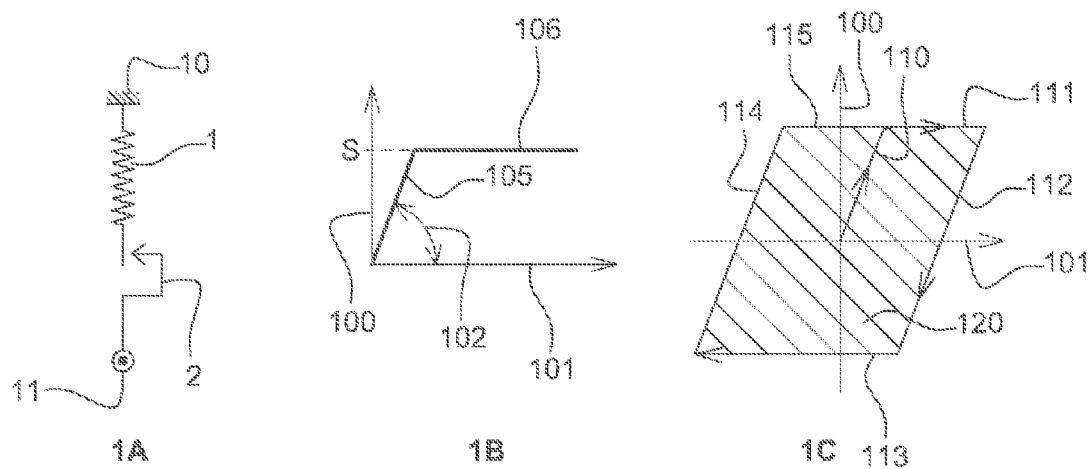
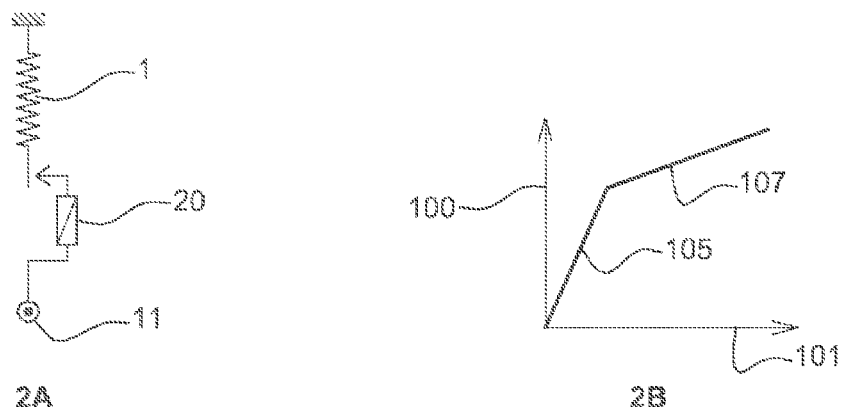
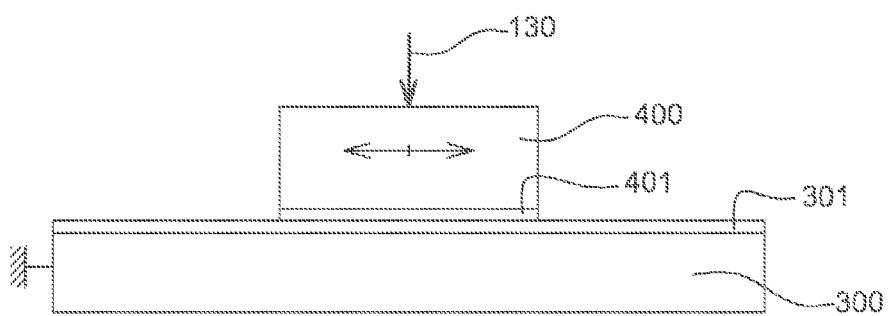
Fig. 3

CONTROLLED FRICTION DAMPING DEVICE

FIELD OF THE INVENTION

The invention relates to a semi-active device used to damp vibrations moving relative to two elements between which said device is fixed.

Such a device is used, for example, in the aeronautics field for damping the vibrations of engines or tanks of launch vehicles or for damping between the load-bearing structure of an observation satellite and sighting systems.

STATE OF THE ART

In document EP 1 277 984, the prior state of the art discloses a friction damper for damping vibrations in a relative translational movement between two members. Such a friction damper behaves like a rigid or elastic connection for relative movements, between the two members, that are below a given threshold; above this threshold, it dissipates energy proportional to the relative movement between these two members. The damping characteristics of such a damper are therefore functions of this threshold. According to this example of the prior state of the art, this threshold is fixed by the setting of springs applying friction pads onto a friction surface; the relative movement of the two members tends to cause the movement of said pads on said friction surface. In this solution of the prior state of the art, the threshold is fixed by setting springs when the damper is assembled. To modify this threshold subsequently, it is necessary to remove said damper, carry out a new setting or replace the springs and then re-install the damper. However, there are situations where it is desirable to adapt the energy dissipation conditions of such a damper so that it responds in an optimum way depending on the nature of the vibrations to be damped. For example, the threshold's optimum value will be different with regard to low amplitude vibrations, therefore with higher frequencies; according to low-frequency vibrations, with higher amplitude; and finally according to almost static conditions. In other circumstances, it might be desirable for the connection achieved with such a damper to generate no force or a negligible force taking the application into account, i.e. for the threshold to be zero.

Document U.S. Pat. No. 6,378,671 discloses a friction damping device wherein the normal contact force defining the slip force can be adjusted by the contraction of a sleeve on a piston; said contraction is caused by applying a magnetic field by means of a coil borne by the piston. Thus, the normal tightening pressure at the friction interface is substantially proportional to the intensity of the magnetic field. This device has several inconveniences. Firstly, the intrinsic structural principle of this device of the prior state of the art, using the radial contraction deformation of a split sleeve, does not permit a constant normal force to be obtained over the entire axial travel of the piston as, for a given magnetic field, the rigidity of the elastic strips between the slots of the sleeve varies from one extremity of said sleeve to the other. Thus, a magnetic field of the same intensity will result in a greater normal pressure on the friction elements at one extremity of the sleeve, the strips' free extremity, than at the other extremity. Next, using a magnetic device limits the possible choices of the materials that can be used. This device of the prior state of the art cannot therefore be made in a light alloy, e.g. with an aluminum or titanium base, and is therefore not very suitable for an aeronautical or space use, where mass criteria are decisive. In addition, it can be difficult to use this device to realize a complete connection under a high slip threshold, since in this case significant electrical power supplies, and possibly cooling the coils, are required. Finally, using a technology based on generating a magnetic field is not suitable for use in the aeronautics or space fields, where such magnetic fields are sources of technical problems for the control and navigation systems.

DESCRIPTION OF THE INVENTION

The invention aims to respond to the shortcomings of the prior state of the art by proposing a friction damping device whose energy dissipation characteristics can be adjusted according to the characteristics of the vibrations to be damped, more especially suited to aeronautics and space applications;
said device comprises:
- a first member extending axially along a longitudinal axis;
- a second member extending axially along the same longitudinal axis, the two members being guided translatably relative to one another;
- a friction element extending between the two members and connecting them completely to each other by friction in an axial translational direction for any force below a threshold 's', said force tending to create a relative translational movement of the two members along said longitudinal axis;
- an adjustment device, comprising a piezoelectric actuator and enabling the value of said threshold to be adjusted;
- means, remote from the first and second members, able to control the contact pressure of the friction element on the surface of at least one of the members, in a range comprising a contact pressure of zero.

Thus adjusting the slip threshold of the friction element enables the connection conditions between two elements connected by such a device to be adjusted, between a total translational freedom of one element relative to the other and a complete translational connection of the two elements thus connected; using piezoelectric actuators allows the device to be made of any type of material, including composite materials with an organic matrix. This type of actuator can be easily controlled by electrical means, which can be easily slaved or controlled at great distance by radio-communication means; it also has the advantage of being able to deliver a variable force at high frequencies. It thus enables the slip threshold's adaptation to be controlled according to the nature of the vibrations that have to be damped by the device that is the subject of the invention.

The device that is the subject of the invention can be implemented according to particular embodiments, described below, each of which may be considered individually or in any technically operable combination.

According an advantageous embodiment, the members are cylindrical; the second member is able to slide in the first and comprises a plurality of friction elements extending radially and distributed over the circumference of the second element. This configuration makes it possible to modulate the slip threshold over a greater range and distribute the energy dissipations, and thus the heating and wear of the elements in contact, while retaining the device's compactness.

According to a particular embodiment, the friction elements are formed from the external surface of the second element; the contact pressure is modulated by the elastic radial expansion of said second member over all or part of its contact length with the first. Thus, the slip threshold is solely function of the normal pressure at the slip interface, which is substantially the same regardless of the second member's axial position in the first.

Advantageously, according to this embodiment the device that is the subject of the invention comprises a plurality of piezoelectric actuators, each acting in a radial direction and distributed over the circumference of the second element. It is thus possible to obtain a uniform distribution of the contact pressure over the second element's circumference, even if there are circularity faults of the members or concentricity faults of the two members, said faults resulting either from the device's manufacture or from its deformation during operation.

Controlling the normal force, individualized on each piezoelectric actuator, also makes it possible to compensate for the effects of the members' thermal expansion and wear on the friction elements' contact pressure.

The invention also relates to a method for controlling a device corresponding to this latter embodiment; said method comprises a step consisting of adjusting the radial contact force between the first and second members by activating the piezoelectric actuators and measuring the normal contact force with the piezoelectric actuators used as force sensors. This method advantageously uses the reversibility of these actuators to precisely adjust the contact pressure and possibly use the information from the actuators used as sensors to take the wear or deformation of the device into account in the adjustment of this contact pressure.

According to an advantageous embodiment of this method, some of the actuators are used as sensors and simultaneously other piezoelectric actuators are activated.

Advantageously, the same piezoelectric actuator is used successively as sensor and actuator.

The device that is the subject of the invention can advantageously be used according to any one of its embodiments in a fastening device for a fuel tank in the body of a launch vehicle comprising a damping device comprising the device that is the subject of the invention. Thus the damping characteristics of said fastening device can be adjusted according to the flight phases or according to the stress conditions of said launch vehicle.

To this end the invention also relates to a method for controlling a tank fastening device according to the invention; said method comprises the following steps:
    adjusting the contact pressure between the two members of the damping device such that the threshold 's' is substantially equal to 0;
    adjusting the contact pressure between the two members of the damping device such that the threshold 's' is other than 0, so as to damp the tank's vibrations;
    one or other of these steps is selected according to the flight phases of the launch vehicle.

PRESENTATION OF THE FIGURES

The invention will now be described more precisely in the context of preferred non-limiting embodiments shown in FIGS. 1 to 6 in which:

FIG. 1 represents a heuristic model (1A) of a friction damping device and its behavior (1B) under simple stress and cyclical stress (1C) conditions;

FIG. 2 represents a heuristic model (2A) of a damping device with control of the slip threshold and an example of the behavior (2B) of such a device;

FIG. 3 illustrates the principle of a friction damper;

Figure 6:
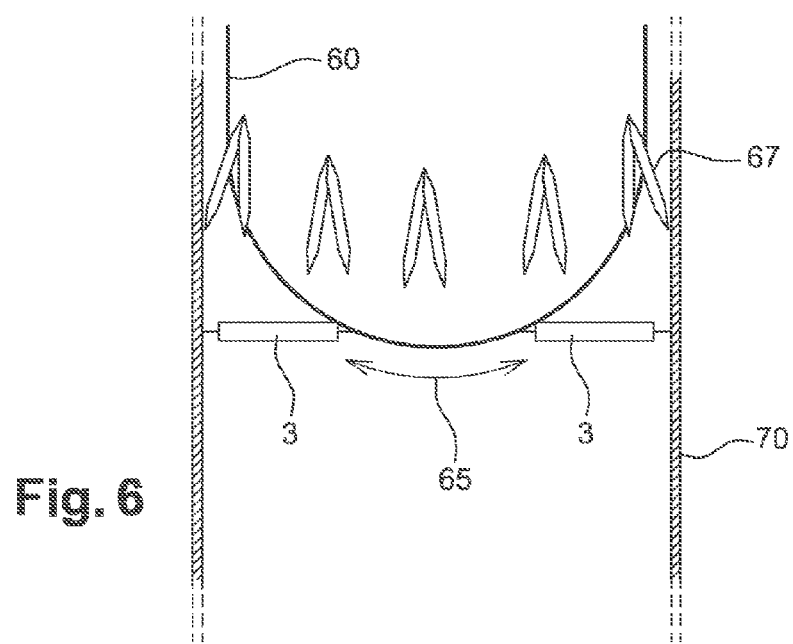

and FIG. 6 illustrates, in a longitudinal cross-section, an example of application of the device according to the invention for damping the vibrations of a tank in a launch vehicle.

DETAILED DESCRIPTION OF EMBODIMENTS OF THE INVENTION

FIG. 1A, a heuristic model of a friction damper, comprises a spring 1 and a pad 2 in series. The spring 1 symbolizes the elastic component of the behavior. Where one of the extremities 10 is fixed, when a force or a movement tending to separate the two extremities 10, 11 from each other is applied to the other extremity 11, the extremity 11 first of all moves under a return force proportional to the stiffness of the spring and the relative movement of the two extremities; the pad 2 remains bonded and transmits the entire force and movement applied to the free extremity 11 to the spring. When the value of the return force reaches the slip threshold of the pad 2, this slips with a constant force equal to the threshold. The force transmitted to the spring is equal to this threshold, whatever the relative movement between the two extremities.

FIG. 1B: this behavior is expressed in a force 100—movement 101 diagram by a curve with two sections 105, 106. The first section 105 is a straight line whose slope 102 is equal to the stiffness of the spring. The second section 106 is a straight line parallel to the axis of the movements 101, the extension of which cuts the axis of the forces 100 at a height corresponding to threshold 's'.

FIG. 1C: when the stress is cyclic, the initial movement is carried out under a return force proportional to the stiffness of the spring 1, then the pad slips when said force reaches the threshold 's'. On releasing the stress, the spring is released according to a curve 112 parallel to that 110 of the first loading and then is compressed, ideally with the same slope, until the pad starts to slip again for a compression threshold equal to—s. The behavior is then symmetrical in the other stress direction 114, 115. Thus, in the force 100-movement 101 space, the travel representing the behavior of such a damper subjected to a periodic stress describes a hysteresis cycle 112, 113, 114, 115, 111 over a stress period. The energy dissipated by the damper during this stress period is proportional to the area surrounded by said hysteresis cycle.

FIG. 2A, in this case a friction damper comprising a pad 20 whose threshold is adjustable: the quantity of energy dissipated for a given stress of said damper can be modulated by modulating the slip threshold 's' of said pad. According to the adjustment device for said threshold, several control laws can be used.

FIG. 2B: according to a particular example of realization, the threshold 's' can be adjusted in proportion to the relative movement of the two extremities; in this case the behavior corresponding to the slipping of the pad in the force-movement space can be any curve, e.g. a straight line 107 not parallel to the axis of the movements 101.

FIG. 3: according to an example of the realization principle, the damping device comprises a fixed first member 300 in contact with a second member 400 moving relatively with regard to the first member. The two members are in contact via friction elements 301, 401. The slip threshold 's' is adjusted by acting on the normal contact pressure between the two members, by adjusting the normal force 130 applied on the member 400 moving relatively.

Figure 4:
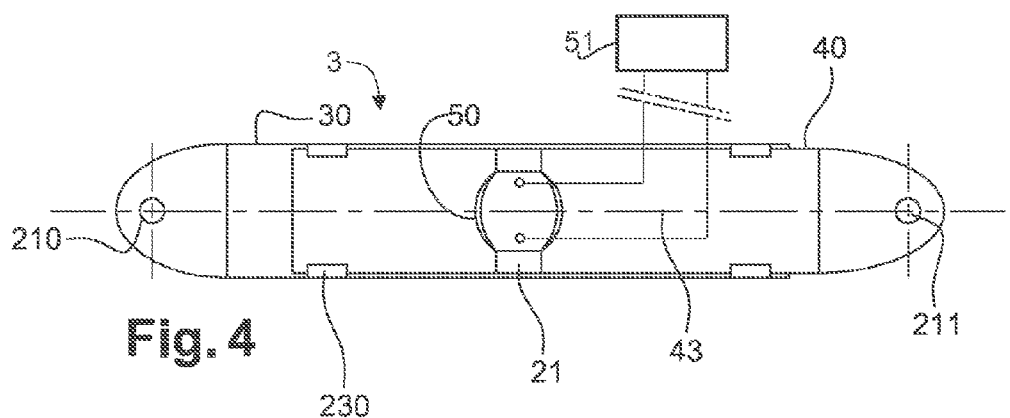
FIG. 4 shows, in a front and longitudinal cross-section view, an advantageous embodiment of a damping device according to the invention using two tubular members able to slide one within the other.

FIG. 4: according to a preferred embodiment of the invention, the damping device comprises two extremities 210, 211 likely to move axially relative to each other along a longitudinal axis 43 of the device. A first extremity is extended by a cylindrical male member 40 extending along the longitudinal axis 43 and bearing one or more friction elements 21. This member is housed in a sleeve 30 extending axially from the other extremity. Translational guidance means 230 enable the male member 40 and the sleeve 30 to be guided relative to each other. When the sleeve 30 and the male member 40 are assembled, the friction elements 21 are in contact with the inside wall of the sleeve, so that a relative movement between the two extremities 210, 211 causes friction of said elements on the inside wall of the sleeve 30.

An actuator 50 enables the slip threshold of the friction elements 21 on the surface to be adjusted by acting on the normal contact pressure between the friction elements and the inside wall of the sleeve 30. The actuator is preferably a piezoelectric actuator. This type of actuator comprises one or more piezoelectric elements, which deform in proportion to the intensity of the electrical field applied to them. If this deformation is constrained, the piezoelectric element delivers a very large force given its great stiffness. The piezoelectric actuators are reversible and can be used as sensors. In that case, the piezoelectric elements are polarized under the effect of the mechanical constraint to which they are subjected, a polarization that can be measured by the voltage difference between the two opposite surfaces of the piezoelectric element along the axis of constraint.

Thus, each piezoelectric actuator just needs to be electrically connected to a control device 51 in order to control it. Said control device 51 can thus be remote from the damping device, and can itself be controlled by radio or computerized means.

Figure 5:
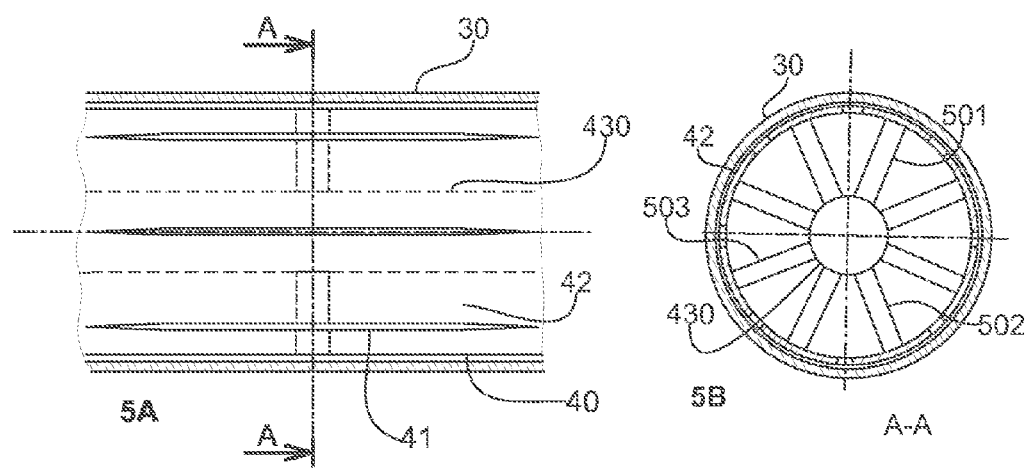
FIG. 5 represents, in a front view (5A) and in a radial cross-section end view (5B), an example of realization of the damping device according to the invention using a plurality of radial actuators.

FIG. 5A: according to an advantageous embodiment, the male member 40 is locally pierced by grooves 41 separating it into angular sectors 42 so as to facilitate its radial deformation while retaining significant longitudinal stiffness.

FIG. 5B: the piezoelectric-type actuators 501, 502, 503 are arranged radially, fixed on a central core 430 connected to the extremity 211 of the male member 40, which extends axially in the latter. They act directly on the portions thus pierced. The action of the piezoelectric elements tends to radially expand the pierced portion, which has the effect of increasing the normal contact pressure of the angular sectors 42 on the inside wall of the sleeve 30.

Typically, the travel imposed by each radial actuator is 100 μm for a maximum normal force of 3,500 Newtons.

FIG. 6: such actuators are, for example, used to damp the vibration of a tank 60 in a launch vehicle. The tank 60 is suspended in the body of the launch vehicle 70 by a plurality of rigid structural fastenings 67. Damping devices 3 according to the invention are, for example, used to damp the residual horizontal movement 65 of said tank. These damping devices can then be controlled, either by on-board means or by a radio link, so as to adapt the stiffness and damping of said fastenings according to the flight phases.

According to an example of realization, the friction force is adjusted so that it is zero during non-critical flight phases. During the critical flight phases the friction elements are brought into contact under a normal pressure able to damp the vibrations. The switch can be controlled by the flight program or by direct measurement of local accelerations.

In that case the normal force on the friction elements can be controlled according to the magnitude of the longitudinal vibrations.

The above description clearly illustrates that through its various features and their advantages the present invention realizes the objectives it set itself. In particular it enables the slip threshold of the friction elements in a friction damper to be adjusted so as to adjust the damper to the operating conditions.

The invention claimed is:

1. A damping device comprising:
a first cylindrical member extending axially along a longitudinal axis;
a second cylindrical member extending axially along the same longitudinal axis and having grooves separating said second cylindrical member into angular sectors, said second cylindrical member being slidable in said first cylindrical member;
a plurality of friction elements extending radially between the first and second cylindrical members and connecting them completely to each other by friction in an axial translational direction for any force below a threshold of a predetermined value, said force tending to create a relative translational movement of the first and second cylindrical members along said longitudinal axis;
an adjustment device comprising a plurality of piezoelectric actuators, each acting in a radial direction and adjusting the predetermined value of said threshold; and
means, remote from the first and second cylindrical members, for controlling contact pressure of the plurality of friction elements on a surface of at least one of the first and second cylindrical members, in a range that includes zero and non-zero contact pressure.

2. The device according to claim 1, wherein the plurality of friction elements are formed from an external surface of the second cylindrical element, the contact pressure being modulated by elastic radial expansion of said second cylindrical member over all or part of its contact length with the first cylindrical member.

3. A fastening device for a fuel tank in a body of a launch vehicle, the fastening device comprising the damping device according to claim 1.

4. A method for controlling a tank fastening device for a fuel tank in a body of a launch vehicle, the tank fastening device including a damping device comprising a first cylindrical member extending axially along a longitudinal axis, a second cylindrical member extending axially along the same longitudinal axis and having grooves separating the second cylindrical member into angular sectors, the second cylindrical member being slidable in the first cylindrical member, a plurality of friction elements extending radially between the first and second cylindrical members and connecting them completely to each other by friction in an axial translational direction for any force below a threshold of a predetermined value, the force tending to create a relative translational movement of the first and second cylindrical members along the longitudinal axis, an adjustment device comprising a plurality of piezoelectric actuators, each acting in a radial direction and adjusting the predetermined value of the threshold, and means, remote from the first and second cylindrical members, for controlling contact pressure of the plurality of friction elements on a surface of at least one of the first and second cylindrical members, in a range that includes zero and non-zero contact pressure, the method comprising the steps of:

adjusting the contact pressure between the first and second cylindrical members of the damping device such that the predetermined threshold is substantially equal to 0;

adjusting the contact pressure between the first and second cylindrical members of the damping device such that the predetermined threshold is other than 0, so as to damp the fuel tank's vibrations; and selecting one of the two adjusting steps according to a flight phase of the launch vehicle.

* * * * *